Oct. 31, 1950 G. R. ISETT 2,528,435
PLATE FEEDING MECHANISM FOR EMBOSSING MACHINES
Filed Feb. 8, 1947 9 Sheets-Sheet 1

INVENTOR:
George R. Isett
By: Spencer, Marzall, Johnston & Cook
Attys.

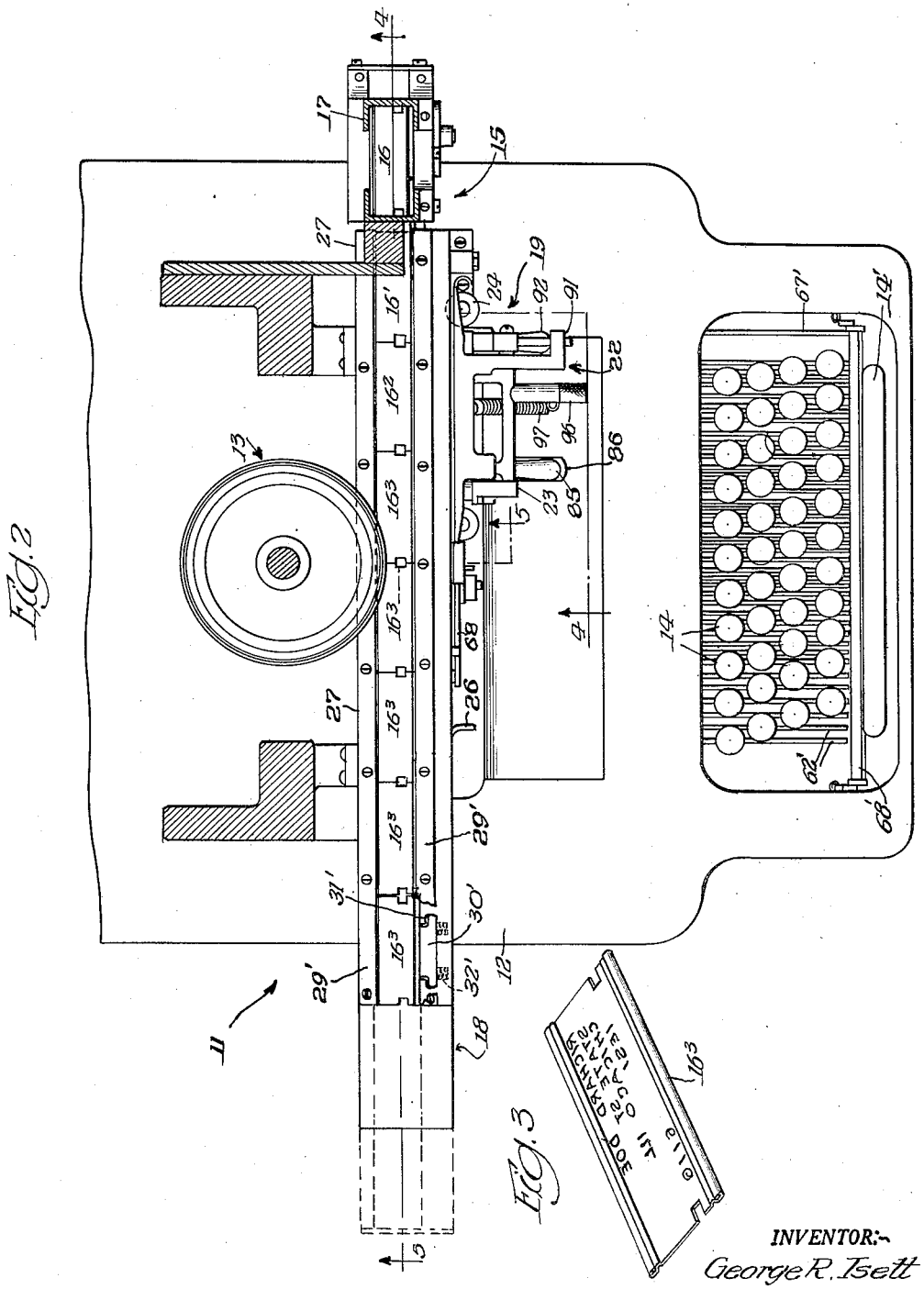

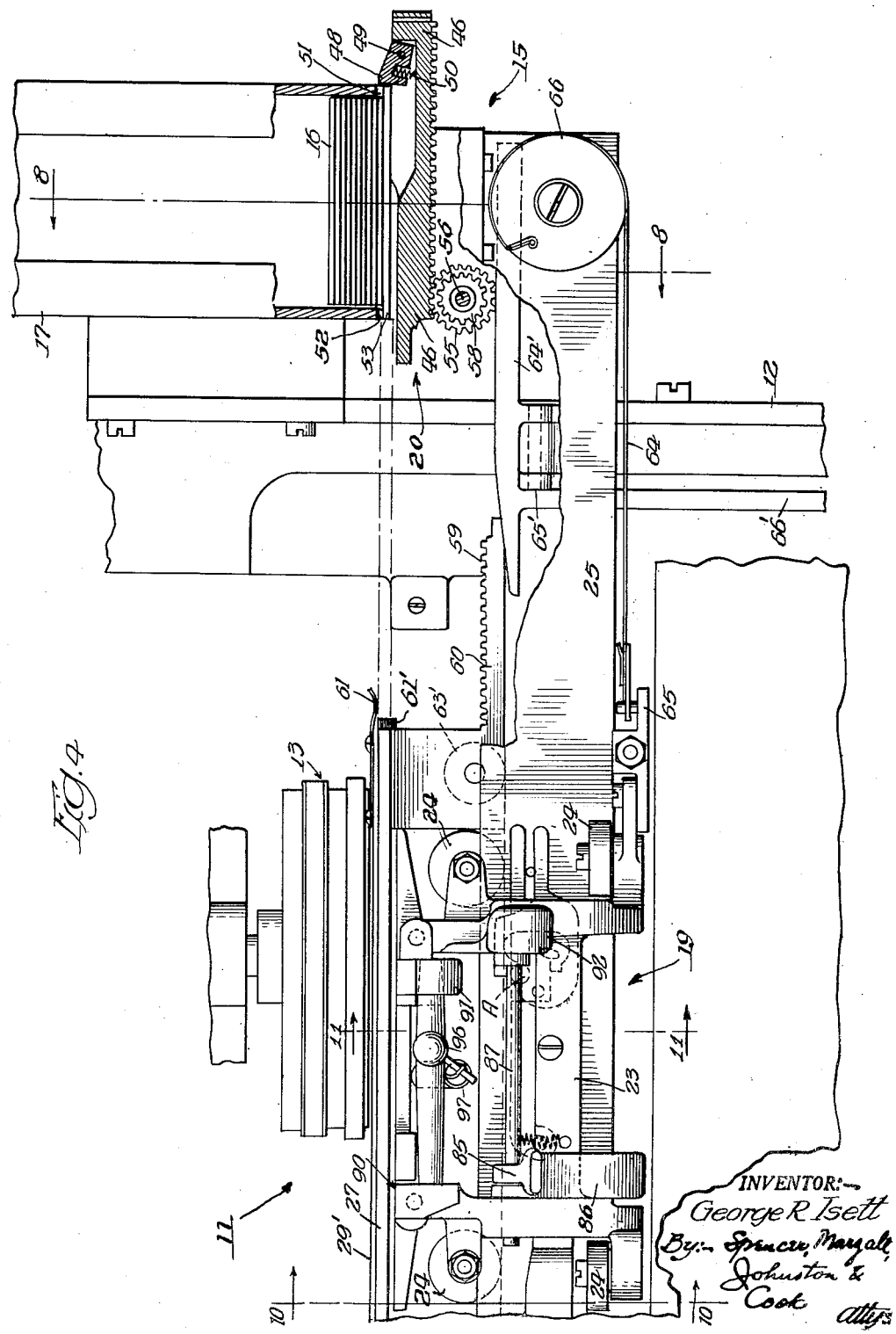

Oct. 31, 1950     G. R. ISETT     2,528,435
PLATE FEEDING MECHANISM FOR EMBOSSING MACHINES
Filed Feb. 8, 1947     9 Sheets-Sheet 4
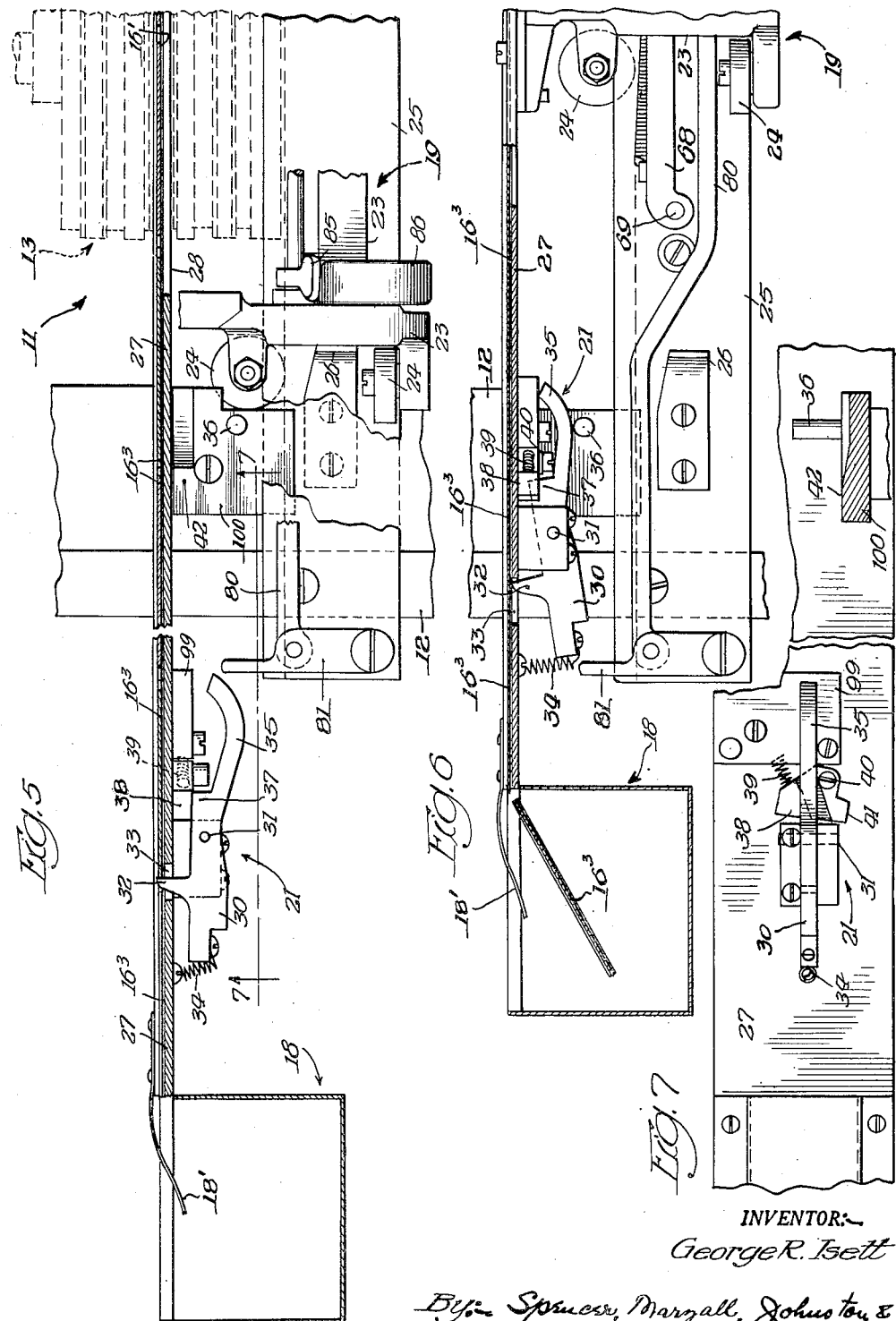
INVENTOR:
George R. Isett
By Spencer, Marzall, Johnston & Cook
attys

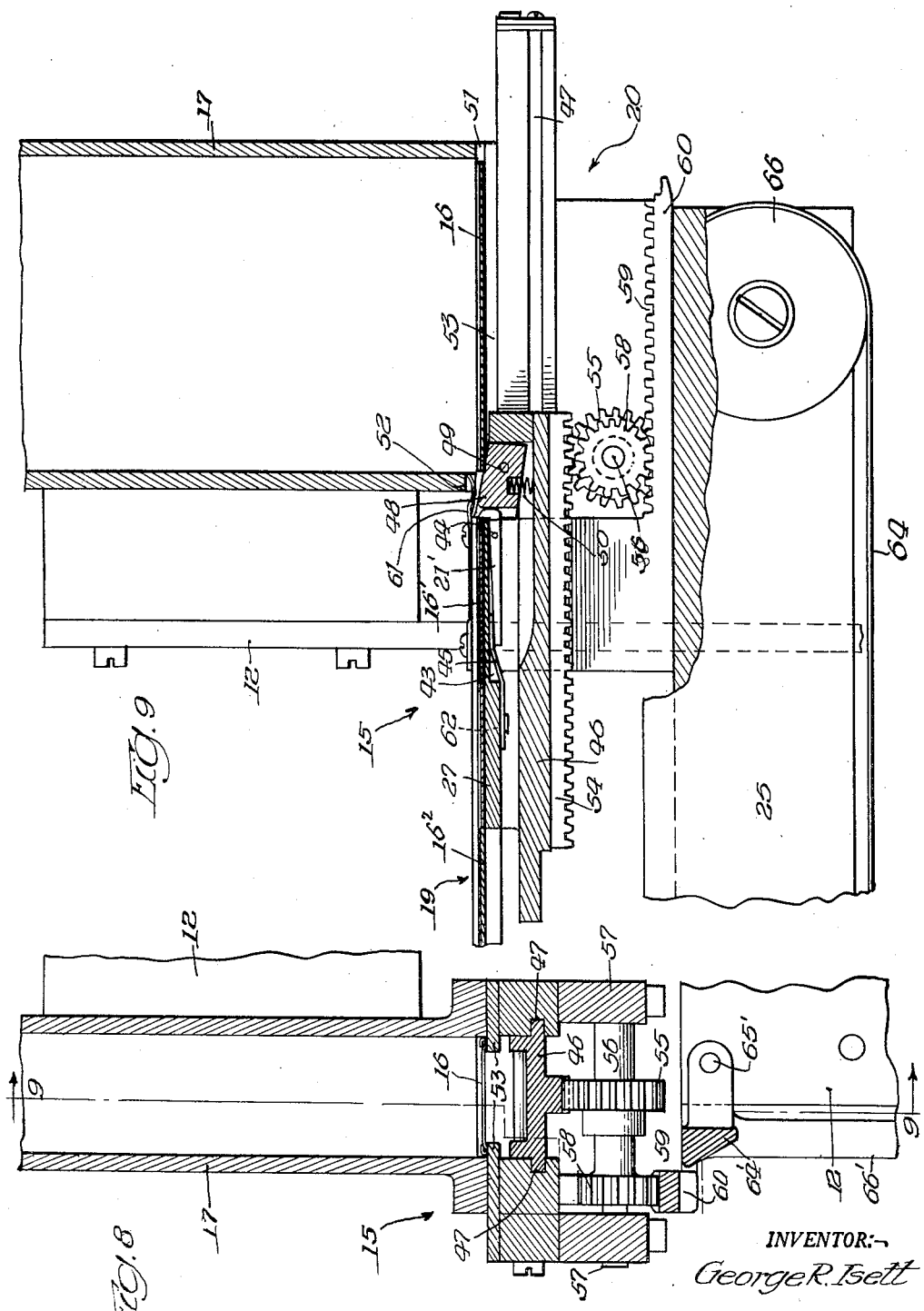

Oct. 31, 1950 G. R. ISETT 2,528,435
PLATE FEEDING MECHANISM FOR EMBOSSING MACHINES
Filed Feb. 8, 1947 9 Sheets-Sheet 6
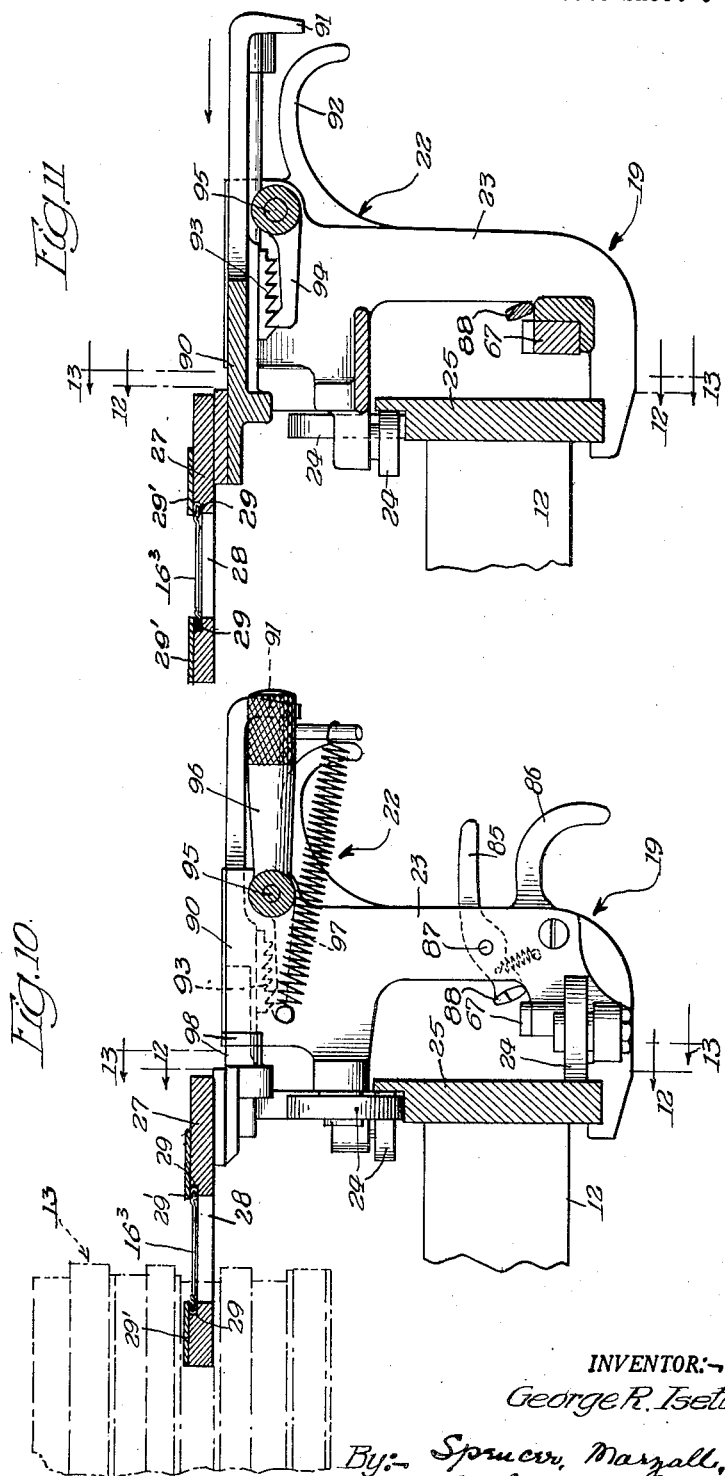
INVENTOR:
George R. Isett
By: Spencer, Marzall,
Johnston & Cook
Attys.

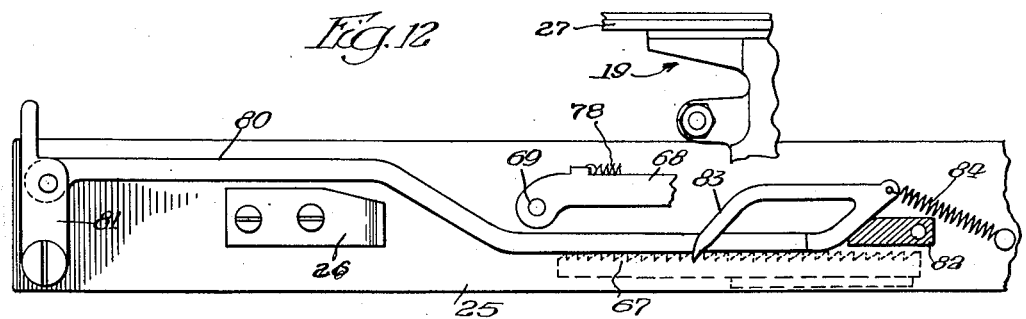
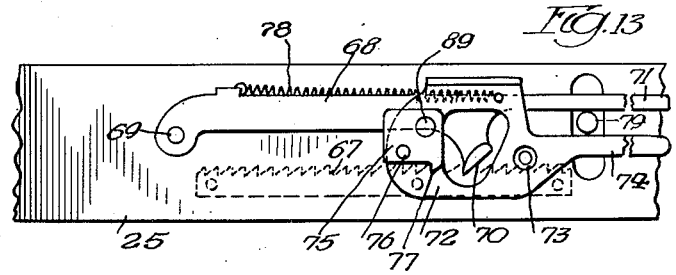
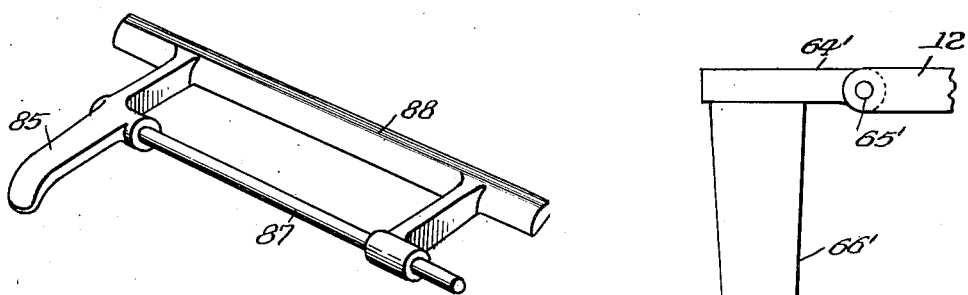
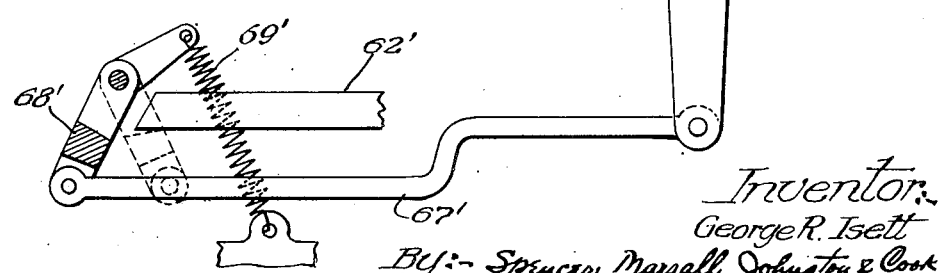
Inventor:
George R. Isett
By Spencer, Marzall, Johnston & Cook
Attys Oct. 31, 1950     G. R. ISETT     2,528,435
PLATE FEEDING MECHANISM FOR EMBOSSING MACHINES
Filed Feb. 8, 1947     9 Sheets-Sheet 8
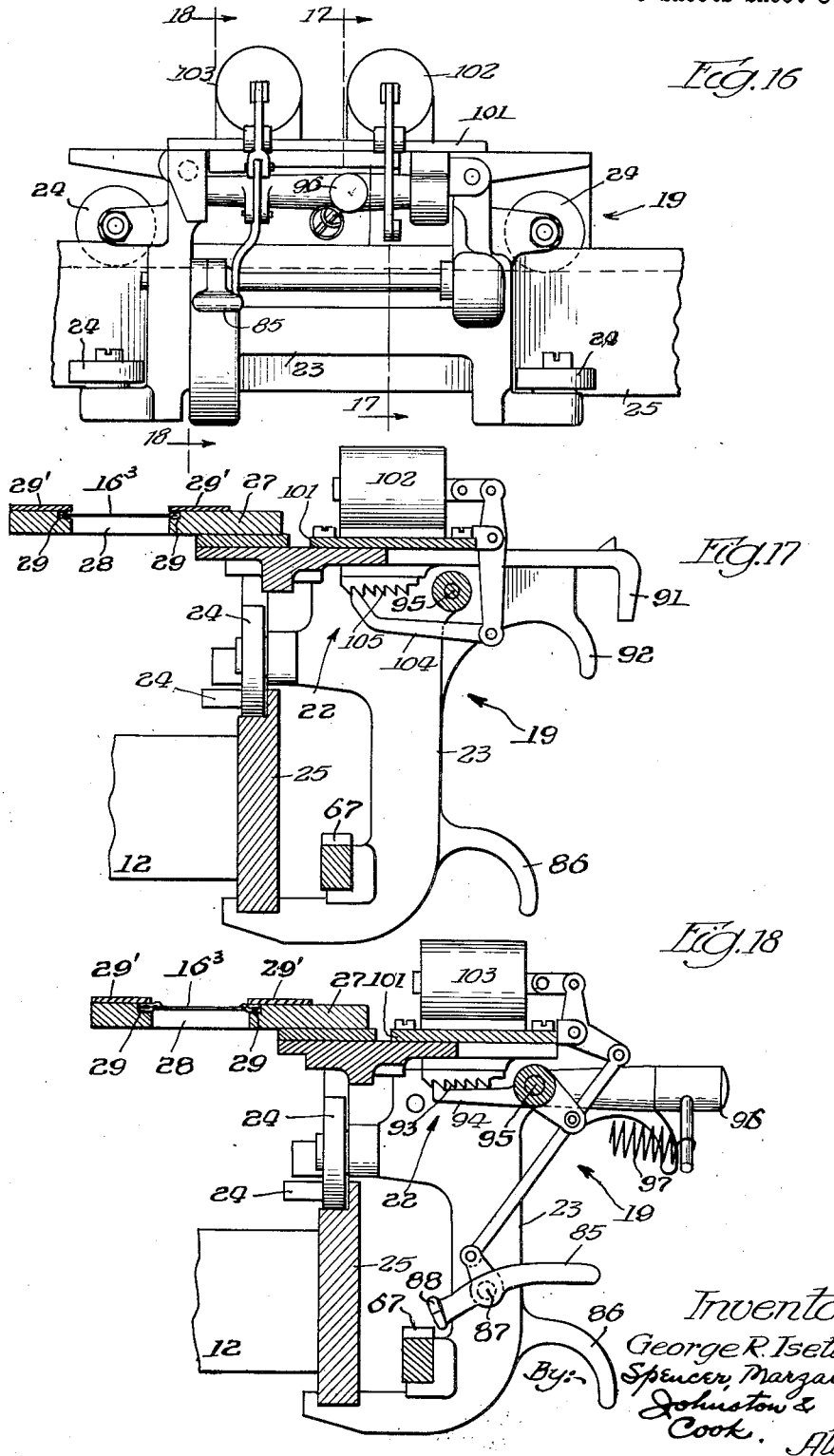
Inventor:
George R. Isett
By: Spencer, Marzall,
Johnston & Cook
Attys Oct. 31, 1950         G. R. ISETT         2,528,435
PLATE FEEDING MECHANISM FOR EMBOSSING MACHINES Filed Feb. 8, 1947         9 Sheets-Sheet 9

Inventor:
George R. Isett
By:— Spencer, Marzall, Johnston & Cook
Attys

Patented Oct. 31, 1950

2,528,435

UNITED STATES PATENT OFFICE 2,528,435

PLATE FEEDING MECHANISM FOR EMBOSSING MACHINES

George R. Isett, Hinsdale, Ill.

Application February 8, 1947, Serial No. 727,438

26 Claims. (Cl. 197—6.6)

The present invention relates in general to feeding mechanism, and has more particular reference to improved means for, and methods of, delivering individual plates or sheets successively to a marking device, in position to be printed, embossed, or otherwise marked. The present invention more especially relates to the delivery of plates successively in position for embossment in a character embossing machine of the sort used in preparing printing plates for mail addressing, and other like printing purposes.

The present invention, of course, may have application where the sheet is marked or embossed as the result of a single operating stroke of the marking machine, but it has especial utility and application where the marking machine is operable to impress the plate or sheet being marked with successively applied characters, including characters applied adjacently and in alinement on the sheet to form, for example, a line of type characters on the plate, as well as characters applied to form successive lines of characters in spaced apart relation on the sheet.

An important object of the invention is to provide improved means for delivering plates or sheets, successively, in position to be marked, including means for moving the plate or sheet, while in marking position, in a direction to present adjacent portions of the plate successively in position to be marked with a character, as the result of a marking stroke of the machine, such operating facility of the machine allowing for the marking of the plate, as with a line of type characters; a further object being to provide facilities for moving the plate, while in marking position, transversely with respect to the direction of a marked line of characters for line spacing purposes, and to support the plate in any one of a plurality of transversely adjusted positions, whereby to allow the marking thereon of a plurality of lines of type charcters.

Another object is to provide for the delivery of a sheet or plate into marking position as the result of the feeding stroke cycle of the feeding mechanism; a further object being to discharge a previously marked plate or sheet from marking position as a result of the feeding stroke cycle of the mechanism.

Another important object is to provide sheet or plate marking means, including a carriage, a storage magazine for sheets or plates to be marked operatively associated with the carriage, and transfer mechanism for delivering a sheet or plate, from the magazine, onto the carriage and into marking position thereon, as a result of the operating stroke cycle of the plate feeding mechanism, the carriage providing means for supporting and moving the plate or sheet longitudinally, while in marking position, to allow for the application thereon of type characters, in alinement thereon, and means for adjustably shifting the sheet or plate, while in marking position, transversely, for line spacing purposes, and for holding the sheet in transversely adjusted position to allow the application thereon of a plurality of spaced apart lines of marked characters; a further object being to provide for the ejection of a marked plate or sheet, from marking position on the carriage, and its ultimate ejection from the carriage, as the result of the plate feeding stroke cycle of the feeding apparatus.

Another important object is to provide improved delivery mechanism, operable to deliver a plate or sheet from the storage magazine into plate feeding position on the carriage, as the result of an operating stroke cycle of the feeding mechanism; a further object being to provide for the advancement of a plate to marking position on the carriage, as a result of a successive stroke cycle or cycles of the feeding mechanism.

Another important object is to provide latch means on the carriage, operable to retain a succession of plates or sheets in feeding position on the carriage, with one of the sheets supported in marking position, including means for releasing the latch means during the operating stroke cycle of the feeding mechanism, to allow a marked plate to be discharged from the carriage, and an unmarked plate to be simultaneously delivered on the carriage in position to be advanved thereon to marking position as the result of a successive operating stroke cycle or cycles of the feeding mechanism.

Another important object is to provide carriage means cyclically movable for the operation of feeding mechanism to deliver blank plates or sheets from a magazine into plate feeding position on the carriage, to advance plates on the carriage to and through a plate marking position thereon, and to discharge marked plates from the carriage, the carriage being adjustably shiftable transversely of the marking mechanism for line spacing purposes, during intervals between successive plate feeding cycles, whereby to allow a plate in marking position to be marked with adjacent lines of characters; a further object being to provide means for latching the carriage, successively or selectively, in any one of a plurality of laterally adjusted positions, while allowing for free longitudinal movement of the carriage when latched in any laterally adjusted position, to thereby allow for the application of a line of type characters on a plate in any laterally adjusted position.

Another important object is to provide for latching the carriage against plate feeding movement, except when the same is in a selected one of its several transversely adjustable line marking positions, preferably the initial line position, whereby the feeding cycle is normally inhibited during the plate marking operation, and can be accomplished only after the carriage has been moved transversely to a feeding position, which conveniently may comprise the first line marking position, at the conclusion of a plate marking operation.

Another important object is to provide manually operable control means for accomplishing the plate feeding cycle of operation of the apparatus, and for transversely adjusting the line marking position of the carriage; a further object being, as a refinement, to provide key or button operated or controlled means for accomplishing or controlling the plate feeding cycle, as well as the transverse or line spacing movement of the carriage; a still further object being to accomplish the control of the plate feeding and line spacing movements of the carriage, electrically or otherwise, under the control of manually operable buttons located in any convenient position, as adjacent the control keyboard of a manually operable character marking apparatus.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 2 is a sectional view taken substantially along the line 2—2 in Fig. 1, with the mechanism shown in plate feeding position, in solid lines, and in marking position in dotted lines;

Fig. 3 is a perspective view of a plate marked by the apparatus shown in Figs. 1 and 2;

Figure 19:
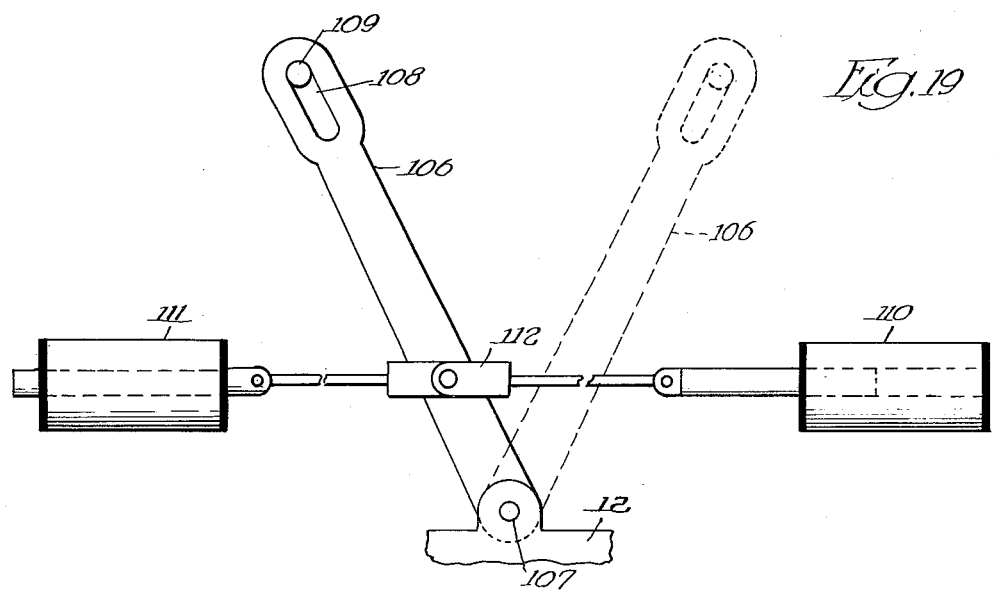

Figs. 4 and 5 are enlarged sectional views taken substantially along the lines 4—4 and 5—5 in Fig. 2, the parts being shown in plate marking position;

Fig. 6 is an enlarged sectional view similar to Fig. 5, the parts being shown in plate feeding position;

Fig. 7 is a view taken substantially along the line 7—7 in Fig. 5;

Fig. 8 is a sectional view taken substantially along the line 8—8 in Fig. 4;

Fig. 9 is a sectional view taken substantially along the line 9—9 in Fig. 8;

Figs. 10 and 11 are sectional views taken substantially along the lines 10—10 and 11—11 in Fig. 4;

Figs. 12 and 13 are sectional views taken substantially along the lines 12—12 and 13—13 in Figs. 10 and 11;

Fig. 14 is a perspective view of a latch release lever;

Fig. 15 is a view of locking mechanism;

Fig. 16 is a front view of a modified form of carriage mechanism for power operation under remote control;

Figs. 17 and 18 are sectional views along the lines 17—17 and 18—18 in Fig. 16;

Fig. 19 is an elevational view of carriage shifting mechanism; and

Figure 20:
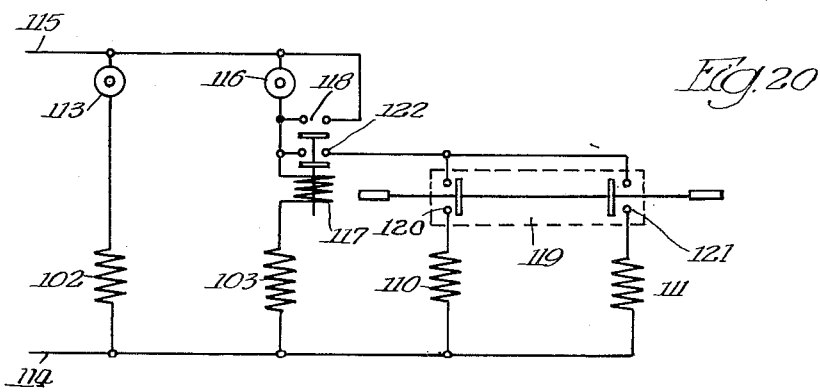

Fig. 20 is a wiring diagram for the remote control operation of the modified embodiment shown in Figs. 16-19.

To illustrate the invention, the drawings show a marking machine 11 comprising a main frame 12, means forming a font of type characters 13 suitably mounted and supported in the frame 12, and mechanism operable under the control of a manually operable keyboard, comprising character keys 14, for selecting any of the type characters 13 and disposing it in marking position. The machine 11 may also include mechanism for accomplishing a marking stroke of the machine, in response to the operation of a key 14, as well as spacing mechanism operable in response to a spacing bar 14', forming a part of the keyboard.

Although the invention is not necessarily so restricted, the marking apparatus 11 may comprise a machine specifically adapted for embossing characters in relatively thin sheet metal stock of the sort commonly used, in embossed condition, for printing purposes, as in the addressing of mail. To this end, the marking apparatus 11 may be power actuated, as by means of a suitable, preferably electric, motor to provide adequate embossing thrust on the selected character element during the marking stroke of the machine.

In the operation of the machine 11 the selected character, upon operation of its corresponding key 14, is presented at a common marking station, so that the marking action always occurs at said marking station regardless of the character selected. Accordingly, in order to make a sheet or plate with a series of characters in alinement on the plate, it is necessary to present adjacent alined portions of the plate successively at the marking station; and if the ptale is to be marked with a plurality of lines of characters, it is necessary to provide for the adjustment of the plate being marked, laterally with respect to the marking station, and to provide for longitudinal line marking movement of the plate in each laterally adjusted position.

The present invention relates more particularly to improved means for rapidly and successively presenting sheets or plates in position to be marked in the machine 11, and to allow for longitudinal line marking movement of the plate in any one or more laterally adjusted line marking positions, while the plate is so presented at the marking station. To this end, the drawings show plate feeding and delivery means 15 mounted in operative association with the marking apparatus 11 and adapted to deliver blank sheets or plates 16, as from a suitable plate magazine 17, in succession past the marking station, and to eject the so delivered plates, in marked condition, at a delivery or discharge station 18. The plate feeding and delivery mechanism 15 comprises carriage means 19 movably mounted on the frame 12 and adapted to receive blank plates 16 delivered in succession from the magazine 17. The plate feeding apparatus comprises ejector means 20 operable as a result of a feeding stroke cycle of movement of the carriage means, to deliver a blank plate 16 from the magazine into feeding position on the carriage means, and to advance the so delivered plate, on the carriage means, through the marking station to the discharge station 18, as the result of repetitions of the feeding stroke cycle of movement of the carriage means.

The carriage means 19 also is longitudinally movable, within limits and in step by step fashion, with respect to the common character marking station, to allow a plate, in marking position on the carriage, to be marked with one or more characters arranged in one or more parallel lines of characters. To this end, the carriage means is longitudinally reciprocable to an extent required to present all markable portions of a plate successively at the common character marking station, when the plate is in marking position on the carrier means. Such reciprocating movement of the carrier means is allowed, or performed, during operating intervals between successive plate feeding stroke cycles of the carriage means. Accordingly, the movement of the carriage means in performing a feeding cycle is of a character different from the movement of the carriage means during the marking operation. While carriage movement, in the performance of a plate feeding cycle, may take any predetermined path, the feeding cycle movement of the carriage, most conveniently and expeditiously, may comprise a longitudinal carriage movement, that is to say, movement of the carriage in the same longitudinal direction as that utilized to enable characters in alinement to be marked on a plate in marking position on the carriage means. As a consequence, as shown in the drawings, the carriage means is arranged for limited reciprocable movement for presenting a plate and moving the same in marking position; and the carriage is also movable longitudinally in one direction from marking position to plate feeding position, and returnable thence to marking position, for the accomplishment of a feeding stroke cycle of the carriage means.

Figure 1:
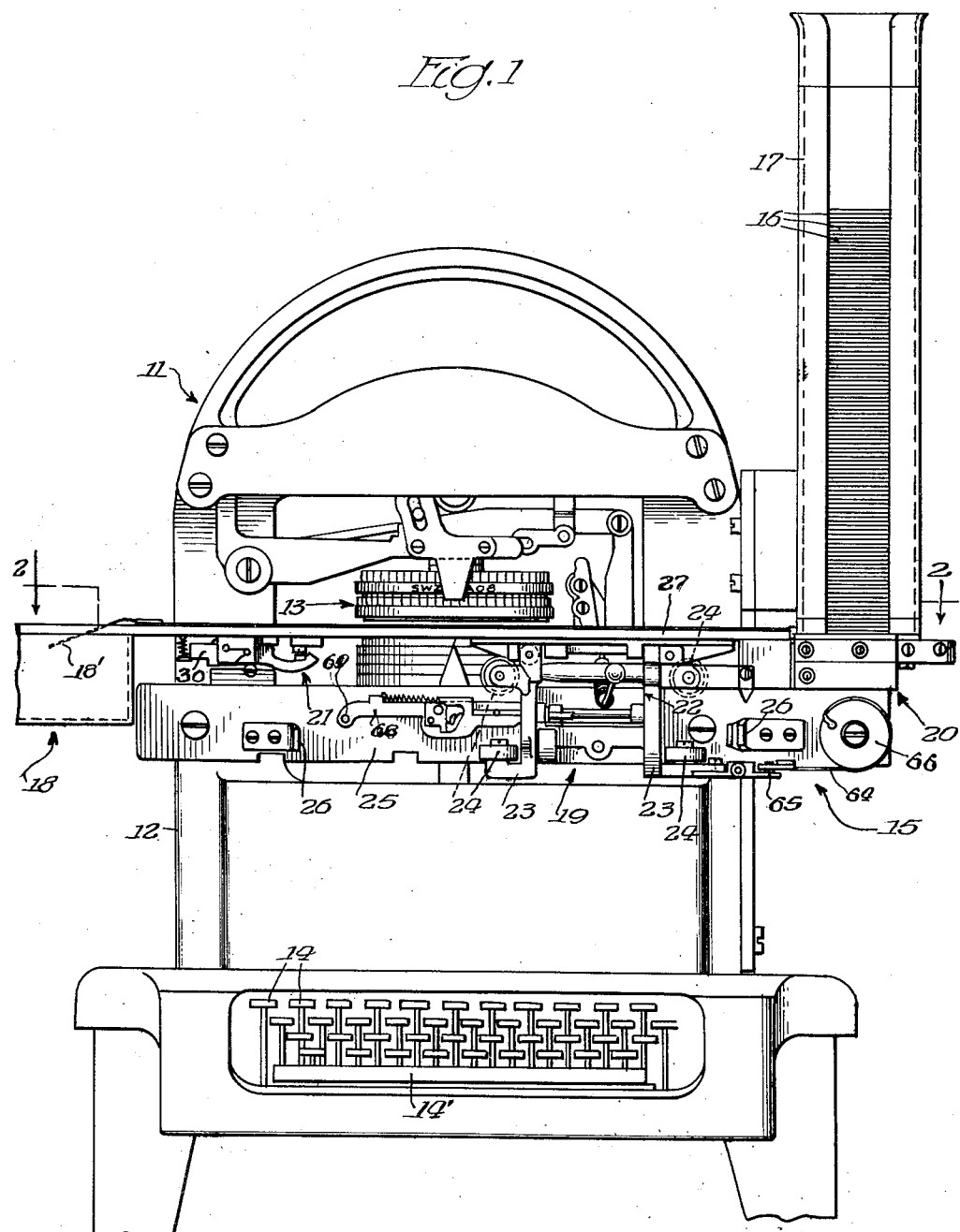
Fig. 1 is a front view of marking apparatus embodying the present invention, the mechanism being shown in its plate feeding position.

More particularly, the operating or marking position of the carriage means is shown in Figs. 4 and 5 of the drawings, in which the carriage means may be moved back and forth within a range substantially equal to the length of a plate to be marked; but the carriage means may also be projected from the operating or marking position, shown in Figs. 4 and 5, to the plate feeding position, shown in solid lines in Figs. 1, 2, and 6, in order to deliver a plate from the magazine 17 into feeding position on the carriage. Thereafter, the carriage means may be returned to the operating or marking position shown in Figs. 4 and 5.

Suitable latch means 21 and 21' are provided on the carriage means for retaining plates against relative movement thereon during intervals between successive feeding stroke cycles of movement of the carriage means.

The carriage means, also, is provided with means 22 for adjusting the same laterally with respect to the common type marking station, while the carriage is in its operating or plate marking position, whereby several lines of characters may be marked on the plate, as the result of repeated longitudinal strokes of the carriage means, while the plate remains in marking position on the carriage and before it is ejected from marking position, as a result of the performance of a plate feeding stroke cycle following the completion of the marking of the plate.

To these ends, the carriage means 19 may comprise a support frame 23 provided with mounting and guiding rollers 24, whereby the same may be mounted for longitudinal movement in either direction, as on a track bar 25 secured to, and forming a part of, the main frame 12 of the marking apparatus, the movement of the support frame 23 on the track being preferably limited in either direction, as by means of movement limiting stops 26 on the track bar 25, in position to engage, and thus limit, the movement of the frame 23 in either direction.

The carriage means 19, also, comprises an elongated plate supporting member 27 formed with a slot 28 therethrough, and formed also with spaced grooves 29 and cooperating retaining strips 29' extending from one end of the member 27 to its other end, for the purpose of receiving and retaining the opposite side edges of plates 16 in said grooves, whereby plates delivered with their edges in the grooves 29 at the feeding end of the member 27, may be retained thereon and advanced, in end to end succession, to the opposite or discharge end of the member 27, with the edges of the plates slidingly retained in the grooves. It will be seen, thus, that, by successively applying plates in the grooves 29 at the feeding end of the member 27, the plates previously applied will be advanced along the member 27 through a marking position or station, as at the slot 28, intermediate the ends of the member 27, the plates being thus advanced on the plate carrying guide 27 by the plate pushing action of the plate delivery means 20 in ejecting a plate from the magazine 17 into feeding position, at the feeding end of the member 27, as the result of the performance of a feeding stroke cycle of operation of the feeding and delivery mechanism 15.

As shown more particularly in Fig. 2, which pictures the feeding mechanism, in solid lines, at the instant when a plate 16' has just been ejected from the magazine to an initial feeding position at the feeding end of the member 27, the adjacent plate 16², delivered to the member 27 during the preceding plate feeding stroke, has been advanced to marking position; and the next adjacent plate 16³, previously in marking position, has been ejected therefrom, in marked condition, and advanced toward the delivery or discharge end of the carriage member 27. It will be seen that the carriage member 27 is long enough to contain several previously marked plates 16³, in addition to the one that has just been advanced on the member 27 from marking position. The number of marked plates thus retained on the member 27 will, of course, depend upon the length of the carriage member, which should be long enough to project the delivery end thereof beyond the frame 12 when the member 27 is in the plate feeding position pictured in solid lines in Figs. 1, 2, and 6 of the drawings.

The marked plate which is discharged at the delivery end of the member 27 as the result of the feeding stroke cycle of operation of the feeding and delivery mechanism 15, may be received at the receiving station 18 outwardly of the frame 12. The receiving station 18, of course, may comprise a receptacle mounted on the frame 12, if desired, in position to receive the ejected plates, said plates being ejected always as the fresh plate 16' is applied in initial feeding position at the feeding end of the member 27. If desired, however, the delivery station 18 may comprise a receptacle mounted on the member 27 at its plate discharge end, as shown more particularly in Fig. 6 of the drawings.

If desired, a clip 18' of resilient spring material may be mounted on the member 27 at its plate discharge end. The clip 18' may have a tail portion extending into the path of plates discharged from the member 27 in order to guide the same downwardly into the receptacle 18 in horizontally stacked relation therein, and to prevent the plates from being received crosswise in the receiver 18.

The latch means 21 serves to retain the plates against displacement longitudinally with respect to the carriage member 27 toward the plate discharging end thereof, at all times, except during the feed stroke cycle of the feeding mechanism. To this end, the latch means 21 may comprise a latch member 30 pivoted, as at 31, preferably on the underside of the member 27 adjacent the plate discharge end thereof. The latch 30 has a detent finger 32 extending in an opening 33 in the member 27; and a biasing spring 34 may be provided to normally urge the latch member 30 on the pivot 31, with the finger 32 extending in the path of movement of the plates on the member 27, to thereby engage the leading edge of an embossed plate $16^3$ and, thus, prevent movement thereof and of the other plates on the member 27 toward its discharge end. The latch member 30, also, may be formed with a tripping finger 35 in position to engage a latch tripping stud 36 on the frame 12, when the carriage means 19 is moved on the track means 25 in the performance of a plate feeding stroke cycle. The latch tripping stud 36 is located on the frame 12 in position to retract the latching finger 32, as shown more particularly in Fig. 6, and, thus, release the plates for feeding movement on the carriage member 27 an instant before the operating cycle of the plate delivery means 20 commences. As a consequence, the plates will be maintained on the member 27 against feeding displacement in a direction longitudinally thereof until the mechanism is operated to deliver a plate from the magazine into the initial feeding position on the member 27. The plates, including the plate $16^2$ in marking position, will thus be retained in fixed position on the member 27 at all times, intermediate successive operating stroke cycles of the feeding mechanism.

In order to insure that the latch 30 remains in latching position, latch locking means may be provided, comprising a locking shoulder 37 on the latch 30, and a locking member 38 may be provided preferably on the underside of the member 27 in position normally urged, as by a spring 39, to engage the locking shoulder 37 and, thus, prevent unlatching movement of the member 30 on its pivot 31. The locking member 38, however, may be mounted for pivotal movement, as on a pivot pin 40, and may be provided with a nose portion 41 in position to engage a lock releasing cam 42, on the main frame 12, as adjacent the release pin 36, to thereby shift the locking member 38 against the urge of its spring 39 and, thus, release the locking shoulder 37. The release cam 42 is preferably positioned on the frame 12 to thus actuate the lock member 38 to release the latch 30 just before the latch release arm 35 engages the release pin 36. The latch locking mechanism is a desirable refinement to insure that the latch remains in plate retaining position at all times, except when released during the feeding stroke cycle, in order to insure against longitudinal displacement of the plate $16^2$ during the plate marking operation, it being understood that power actuated embossing machines are under considerable vibration, which might cause plate shifting on the member 27 unless positively locked in place.

It will be noted that the latch 21, as shown in the drawings, latchingly engages the embossed plate $16^3$ next adjacent the endmost embossed plate that is in position, at the discharge end of the member 27, to be ejected into the receiver 18. The endmost plate, thus, is not secured by the latch 21. In order to hold said endmost plate on the member 27 until ejected therefrom as the result of the plate feeding cycle of the carriage means, a friction brake may be applied comprising a shoe member 30', seated in a cavity 31' formed in the member 27, as under one of the strips 29'. The cavity is arranged to present a braking surface of the shoe member 30' in one of the grooves 29 in position to frictionally engage an edge of an embossed plate $16^3$ in the endmost or plate discharging position on the member 27. A spring or springs 32' may be provided to press the shoe, in the cavity, into frictional plate holding engagement with the embossed plate to be held.

If desired, of course, the magazine 17 may be mounted upon the carriage member 27, to move therewith, and suitable plate ejecting mechanism may be provided for delivering a plate from the magazine into the grooves 29 of the member 27, as the result of a feeding stroke cycle of movement of the carriage means. To this end, the plate ejecting mechanism may include a plate pusher actuated by engagement with an actuating stop on the frame 12 during the feeding stroke cycle of the carriage means. In order to minimize over-all weight on the carriage means, it is desirable to mount the magazine firmly on the frame 12, and to provide ejector mechanism operable to deliver a plate at the feeding end of the member 27 as the same is brought into juxtaposition with the delivery end of the magazine during the feed stroke cycle of the carriage means. By thus separating the magazine from the carriage means, the latter is not required to support the weight of the magazine and contents. The carriage, thus, has low inertia and may operate freely and quickly during the reciprocating movements of the carriage means in the plate marking operation.

The latch means 21' is provided at the plate receiving end of the member 27, and preferably comprises a detent supported on the member 27, as in a groove 43, on the underside of the member 27, the detent having a nose extending in position to engage the trailing end of a plate in the initial plate position 16', whereby to retain said plate against retrograde movement on the member 27. The detent may be mounted for pivotal movement, as on a pivot pin 44, and may be urged on its pivot as by means of a spring 45 into plate retaining position, said detent being depressible against the influence of its actuating spring 45 to permit a plate to be fed from the magazine into the initial plate position 16' on the member 27 during the performance of the plate feeding cycle of the apparatus.

While any suitable or preferred mechanism may be employed for ejecting a plate from the magazine 17 to the initial plate position 16', the ejecting mechanism 20, as shown more particularly in Figs. 8 and 9 of the drawings, may conveniently comprise an ejector slide 46 mounted for reciprocating plate feeding movement, as in guideways 47 at the feeding end of the magazine. Accordingly, the ejector slide may normally occupy an inactive position beneath the magazine and in position supporting the lowermost plate, of the plate stack in the magazine, upon the slide 46. At its rearward end the slide 46 may carry a plate engaging finger 48, mounted on a pivot 49 for limited rocking movement between projected plate engaging position and a depressed retracted position, said finger 48 being normally urged on the slide 46 to the projected plate engaging position, as by means of a spring 50.

By moving the slide 46 from its retracted or inactive position beneath the magazine 17 to the projected plate feeding position shown in Fig. 9, the plate engaging finger 48 being in projected position, said finger, being in engagement with the trailing end of the lowermost plate in the magazine, will carry said plate, on the slide 46, from the magazine to deliver the same into the initial feeding position on the member 27. Thereafter, during retraction of the slide member 46 from the projected or feeding position shown in Fig. 9, to the inactive position, the plate feeding finger 48 may be depressed on the slide to allow the same to pass beneath the lowermost plate remaining in the magazine. When the projector slide reaches stand-by position, the plate feeding finger 48, after passing into feeding position behind said lowermost remaining plate, will be projected by the spring 50 into position to engage said plate and feed the same during the next succeeding projection of the slide 46.

The feeding finger 48 is preferably disposed centrally on the slide 46, and the wall of the magazine 17 at its lower end may be provided with a notch 51 for receiving the finger 48 in projected feeding position behind the trailing end of the lowermost plate in the magazine, the walls of the magazine on either side of the notch 51 serving to engage the trailing end edges of the lowermost plate in the magazine, to hold the same in position during the retraction of the slide 46 therebeneath. The wall of the magazine, at the front or leading end of the lowermost plate therein, is provided, of course, with an opening 52, through which the plate being ejected may be delivered by the action of the slide 46. While the slide 46 is in the projected position shown in Fig. 9, the opposed side edges of the lowermost plate in the magazine may be supported on suitable ledges 53 formed at the lower end of the magazine.

In order to project the ejector slide 46 when the carriage member 27 is in juxtaposition with respect to the magazine, to receive the ejected plate at the receiving end of the member 27, the ejector member 46 may be provided with a driving rack 54, preferably on its underside, in position to drivingly engage a pinion 55 carried on a shaft 56 suitably journaled in bearings 57, secured as at the lower end of the magazine 17. The shaft 56 also carries a driving gear 58 in position to be engaged by a driving rack 59 mounted on a projecting arm 60, comprising a part of the carriage means 19. The driving rack 59 is so positioned that it will make driving engagement with the gear 58 as the carriage means 19 is moved toward the magazine in the performance of the plate feeding cycle. In this connection, it should be remember that the plate feeding movement of the carriage means may be accomplished only when the member 27 is in a predetermined position of lateral adjustment, whereby it will be in plate receiving registration with the magazine during the performance of the plate feeding cycle.

Accordingly, as a plate is projected from the magazine, through the opening 52, by operation of the ejector slide 46, the opposed edges of the plate will ride upon and be supported by the ledges 53. At the same time, the plate receiving end of the member 27 will be moved toward the magazine with the grooves 29 in alinement with the opposed edges of the plate being delivered. The said edges at the forward or leading end of the plate will enter the grooves 29 before the trailing end of the plate leaves the ledges 53, which thus serve to guide the plate onto the carriage member 27. If desired, a guide clip 61 may be applied at the receiving end of the member to aid in guiding the plate into the grooves 29. It will be noted, also, that, at the moment the plate is completely delivered into the initial plate position 16' on the member 27, the latch 21' will have engaged behind the trailing edge of the plate and the end of the member 27 will be in position abutting the magazine 17. In order to limit further movement of the member 27, it may be provided with an adjustable stop bumper 61', comprising a headed member threadingly mounted on the end of the member 27 in position to engage a cooperating stop portion on the magazine 17 or frame 12.

As an alternate arrangement, the driving rack 59 may be separated from the carriage means and may be permanently connected in driving engagement with the gear 58. To this end, the rack member may be slidingly mounted in a suitable way on the frame 12 or on the magazine as below the bearings 57. Spring means may be provided to yieldingly urge the rack in a direction to normally hold the ejector slide 46 in the retracted position shown in Fig. 4. So arranged, the rack member 60 may normally be in position to be engaged and moved by a shoulder on the carriage means, to thus actuate the plate ejector slide as the carriage means is moved to plate feeding position. If desired, the rack actuating shoulder, in such an arrangement, may be made adjustable in order to accurately time the operation of the ejector slide with the plate feeding movement of the carriage means.

It is desirable to provide means for inhibiting operation of the embossing device during the performance of the plate changing cycle. Accordingly, means may be provided for locking the marking apparatus against operation whenever the carriage means is moved from marking position during its plate changing cycle. To this end, each of the keys 14 may be provided with a locking projection 62', all of said locking projections preferably extending in alinement and being normally unlatched for free, unimpeded operation of the character keys 14. As soon, however, as the carriage means is moved from marking toward plate feeding position, a roller 63' on the carriage means rides upon a cam bar 64', pivotally mounted, as at 65', on the frame 12. The cam bar has an arm 66' drivingly connected, as by a connecting rod 67', with a key lock bar 68'. Spring means 69' may be connected to hold the bar 64' and its arm 66', also the connecting rod 67' and the lock bar 68', normally in inactive unlatched condition. Upon depression of the bar 64', however, the lock bar 68' may be moved into position under the locking projections 62' of the keys 14 to prevent operation thereof during the plate changing operation.

As the result of the performance of a plate feeding cycle of the carriage means 19, it may be returned to the marking position with an unmarked plate in the marking position 16² on the carriage means. Thereupon, the plate may be marked, as by operation of the keys 14, the marking mechanism including traversing mechanism for shifting the carriage means longitudinally during the marking of a line of characters, in response to the operation of the key means 14, including a key for each character or symbol to be marked, and a spacing key 14'. For plate embossing purposes in fabricating printing plates, it may be desirable, as a matter of convenience, to emboss the characters in inverted position, the traversing mechanism, in such case, being arranged to cause step-by-step movement of the carriage means from left to right, viewing Figs. 1 and 2, whereby to allow the marking of characters in succession and in inverted position from the right hand end toward the left hand end of the plate being marked. Embossing, of course, may take place from left to right on the plate being marked, in which case the traversing or step-by-step line marking movement of the carriage means will take place from right to left. Accordingly, the present invention is not limited to the direction of marking movement.

In this connection, the carriage means may be normally urged in its direction of marking movement, as by means of a flexible tension member 64 having an end attached, as at 65, on an extension of the carriage frame 23, the other end of the tension member 64 being wound, as on a spring drum 66, which may conveniently be mounted as on the carriage track member 25. The traversing mechanism comprises pawl means for normally holding the carriage means against movement on the track means 25, said pawl means operating to allow stepping movement of the carriage means, under the influence of the spring tension element 64, each time a key 14 or the space bar 14' is operated. To this end, the carriage means 23 is provided with a traversing rack 67 adapted to move with the carriage means 23 along and adjacent the track bar 25. The track bar 25 carries release pawl means shown more particularly in Fig. 13 of the drawings, comprising a pawl member 68, pivoted at 69, on the track bar 25, and having a rack engaging detent tooth 70 and an actuating arm 71. The release pawl means also comprises another pawl member 72, pivoted at 73, on the track bar 25, and having an actuating arm 74. The pawl member 72 carries a detent element 75, pivoted thereon at 76, and having a rack engaging pawl tooth 77. Spring means 78, conveniently mounted on and between the pawl members 68 and 72, may serve to normally urge them on their respective pivots 69 and 73 to yieldingly present the teeth 70 and 77 against the rack 67. The actuating arms 71 and 74 are preferably spaced apart to engage opposite sides of an actuating pin 79. This pin is normally held in position to support the tooth 70 out of engagement with the rack 67, while simultaneously holding the member 72 in position with its tooth member 77 in restraining engagement with the rack 67. The pin 79, however, is associated with each of the character keys 14 and the spacer bar 14'. Whenever a key 14 or the bar 14' is operated, the pin 79 is moved to release the tooth 77 from, and apply the tooth 70 to, the rack bar; and thereafter to return to normal position releasing the tooth 70 from, and reapplying the tooth 77 to, the bar. As a result of this action, the rack and attached carriage means may be moved one step in the direction of and by the spring tension device each time a key 14 or the space bar 14' is operated.

Back spacing mechanism, as shown in Fig. 12, may be provided, comprising a bar 80, connected to a manually operable back spacing key 81 pivoted as on the track bar 25, said bar 80 having a portion riding on a guide cam 82 and a rack engaging tooth 83. Spring means 84 normally holds the bar 80 on the cam 82, with the tooth 83 disengaged from the rack 67. By moving the key 81, the bar may be drawn on the cam to engage the tooth 83 with the rack and to thus move the rack and the attached carriage one step in a direction opposite to the pull of the tension means 64, the tooth 77 yielding on its pivot 76 to allow such retrograde movement, and thereafter engaging the rack 67 to hold the carriage in such back stepped position.

It is preferable that the plate changing movement of the carriage means be accomplished in the same direction as the step-by-step marking movement, so that the tension member 64 may aid in moving the carriage means from marking to plate feeding position. As a consequence, the carriage shifting mechanism may comprise the releasing means, normally operable under the control of the character keys 14 and spacing bar 14', to allow step-by-step movement of the carriage means during the marking operation. However, when it is desired to perform the plate feeding cycle, the holding and releasing pawl mechanism may be released, as by means of a release lever 85, to allow the carriage means to be moved to plate feeding position and returned to marking position, as by means of a handle 86.

The release lever 85 may comprise a manually operable finger piece, preferably disposed above the handle 86, so that by gripping the handle and finger piece and simultaneously pushing on the handle, the traversing mechanism may be released and the carriage means moved to plate changing position as the result of a single operating movement. The release lever 85 is pivoted for movement on a pin 87 on the carriage frame 23, and preferably includes an elongated blade 88 adapted to ride with the carriage beneath a release pin 89 on the pawl member 75. The blade 88 is long enough so that a portion thereof is in operating position beneath the pin 89 at all times when the carriage means is in the plate marking zone. Accordingly, the pawl 77 may be released from the rack, regardless of its relative position lengthwise of the rack, by operating the release lever 85.

In order to allow for the application of more than one line of marked characters, on a plate in marking position on the carriage member 27, means is provided for adjusting said member laterally on the carriage frame 23. To this end, the frame 27 may be supported, as on a bracket 90, which, in turn, is shiftably mounted on the carriage frame 23 for movement thereon in a direction laterally of the carriage track 25. The bracket 90 may conveniently be provided with an operating handle 91 to facilitate movement thereof on the carriage frame 23. To aid in operating the handle 91, as by thumb pressure, the carriage frame 23 may be provided with a convenient finger grip 92 adjacent the thumb piece 91. Suitable detent means, comprising a series of ratchet teeth 93, on the bracket 90, and a holding pawl 94 pivoted, as at 95, on the carriage frame 23, are provided to secure the frame 90 and the member 27 in any one of a plurality of laterally adjusted positions.

The pawl 94 may be provided with a release handle 96 and may have associated spring means 97 normally urging it in a direction on its pivot 95 to engage the teeth 93. Spring means which may, as shown, comprise the spring 97, or may comprise a separate spring, is provided to normally urge the bracket 90 in one direction, toward the right in Figs. 10 and 11, with respect to the carriage frame 23. Movement of the bracket in such direction may be limited by cooperating stops 98 on the bracket 90 and frame 23, such stops preferably defining the initial or first line position of lateral adjustment of the carriage means. By pressing upon the thumb piece 91, the bracket 90 may be shifted successively to, and, by the pawl 94, latched in, laterally shifted line marking positions defined by the several ratchet teeth 93. A plate in the marking position $16^2$ on the member 27 may be marked with successive lines of characters by so adjusting and latching the bracket 90. At any time, as at the completion of a plate marking operation, the carriage means may be returned to the initial line marking position by operating the handle 96 to release the pawl 94 from the ratchet 93, whereupon the spring 97 will return the bracket 90 to the initial position as determined by the stops 98.

Since, in the preferred embodiment, the magazine 17 is mounted in fixed position on the frame 12, it is desirable to prevent the carriage means from moving through its plate changing cycle, except when the plate carrying member 27 is in a selected laterally adjusted position on the carriage frame 23, namely, that position of lateral adjustment in which the member 27 is in plate feeding alinement with the magazine and the plate delivery member 46. Accordingly, interlocking means is provided whereby the plate feeding cycle of movement of the carriage means is prevented for all laterally adjusted positions of the member 27 other than a predetermined plate feeding position, which preferably comprises the initial or first line marking adjustment of the member 27.

To this end, the member 27, preferably on its under side, may be provided with a gate bar 99, which, as shown, may comprise the mounting for the latch lock member 38. Obviously, however, the gate bar 99 may comprise a member entirely separate from the latch lock mechanism. This gate bar may be applied at any convenient location on the member 27, in position to cooperate with a post 100 on the frame 12. This post, as shown, may comprise the member which carries the latch release pin 36 and the lock release cam 42, although it could, of course, be an entirely separate element. The bar 99 and post 100 are so arranged that the bar may pass the post only when the member 27 is in that position of lateral adjustment in which it is in alinement with the magazine and delivery means 46. In the illustrated embodiment, this is the initial or first line marking position in which the lower edge of the bar 99, as shown in Fig. 7, clears the upper edge of the post 100 when the member 27 moves toward the right in moving to plate changing position. In any other position of lateral adjustment, the member 27, as shown in Fig. 7, will be displaced downwardly with respect to the post 100. As a consequence, the gate bar will engage the post and prevent movement of the member to plate changing position. Obviously, the gate bar could be mounted on the frame 12 in position to cooperate with a post or pin on the member 27. The post and bar are preferably arranged to prevent movement of the member 27 beyond the zone of traversing movement of the carriage means required for plate marking purposes. The mechanism may, of course, be constructed to allow plate feeding movement in any desired position of lateral adjustment of the member 27, which may or may not be one of the laterally adjusted line marking positions.

It will be seen from the foregoing that the mechanism is of relatively simple and rugged construction, allowing for the rapid traversing movement of the carriage means in marking position, as well as for the rapid performance of its plate changing cycle. The plate changing cycle occurs in the same direction as does the marking movement of the carriage, so that the single carriage track 25 is used not only in traversing the plates for marking purposes, but also in feeding the plates successively from the magazine into marking position. The relatively few, simple latches are not of complicated nature, and may be readily supplied for the purpose of adapting the mechanism of the present invention to any marking device.

As a further refinement, as shown in Figs. 16-20, it is within the contemplation of the present invention to provide for the remote controlled power operated actuation of the marking device. To this end, the frame 23 may be provided with a support plate 101 carrying a pair of solenoids 102 and 103. The solenoid 102, when energized, may actuate a pawl 104 cooperatively associated with a set of ratchet teeth 105 on the slide 90, said ratchet teeth being similar to the teeth 93. Each time the solenoid 102 is energized, the slide 90 may be moved sufficiently to shift the plate holder from one line marking position to the next adjacent line marking position.

The solenoid 103 is mechanically connected with the holding pawl release lever 96 and with the traverse latch release lever 85, so that when said solenoid 103 is electrically energized, the latch detent 94 and the traverse latch 77 will both be released respectively from the ratchet teeth 93 and the traversing rack 67. A lug on the detent 94, in position overlying the pawl 104, may operate to release the same from the teeth 105 when the detent 94 is thus released from the teeth 93 by action of the solenoid 103.

Power operated means, also, may be provided for moving the frame 23 from the marking to the plate changing, and then back to the marking, position. This may be accomplished, as shown more particularly in Fig. 19, by a power driven frame moving lever 106, which may be pivoted on the main frame 12, as at 107, at one end of the lever, the opposite end of the lever being formed as with a slot 108 for receiving a frame driving pin 109 fastened in any suitable position on the frame 23. By rocking the lever 106 on its pivot 107, the frame 23 may be projected from marking position to plate changing position and may be returned to marking position. As shown, the lever may be thus rocked by connecting the same with a pair of rocking solenoids 110 and 111, said solenoids being mounted, as on the frame 12, and connected with the lever 106 as by means of a yoke 112. When the solenoid 110 is energized, it will serve to project the frame 23 from marking to plate changing position; and the frame may then be returned to marking position by energizing the solenoid 111. Obviously, any suitable controllable power operated mechanism may be employed for so shifting the frame 23. For instance, a continuously operating motor may be employed for the purpose, having clutch connected means for connecting the motor to move the frame to plate changing position, and separate clutch connecting means for returning the frame to marking position, such clutch connecting means being normally inoperative and rendered operable as by energizing solenoid devices similar to the devices 110 and 111.

For the purpose of operating and controlling the several solenoids 102, 103, 110, and 111, the solenoid 102 may be electrically connected in series with a control switch 113 between suitable electrical power conductors 114 and 115, while the solenoid 103 may likewise be connected between said power conductors in series with a control switch 116. The control switches 113 and 116 may comprise push buttons conveniently located on the frame 12, as adjacent the keyboard of the marking device, and the electrical connections from the solenoids 102 and 103 on the shiftable frame 23 may be accomplished through solenoid connected contact brushes on the frame 23 and cooperating contact strips on the track bar 25, electrically insulated therefrom and electrically connected with the control button switches 113 and 116, and with the power conductor 114.

A relay holding switch, having an operating coil 117, preferably connected in series with the control button 116 and the solenoid 103, may have normally open switch contacts 118 connected in a circuit having parallel relationship with respect to the button control switch 116. When the button switch 116 is closed, the coil 117 of the holding switch will be energized to close the switch 118, and thus maintain the energizing circuit to the solenoid 103, even though the switch 116 be immediately released and thus opened. Accordingly, after the switch has been operated to energize the solenoid and release the latching pawls 94 and 77, and the driving pawl 104, the solenoid 103 will remain energized to hold the pawls in unlatched condition during the plate changing operation.

The solenoids 110 and 111 are interconnected in parallel relationship between the power conductors, and said solenoids are both in series relationship with the control switches 116 and 118. The solenoids 110 and 111, however, are each in circuit with a corresponding switch 120 and 121, said switches being interconnected so that one is closed when the other is open, and vice versa. Said switches 120 and 121 may form a switch unit 119 of the toggle type, and switch operating means actuated by the carriage may be provided for the operation of said switches. Preferably, such switch operating means is arranged to open the switch 120 and close the switch 121 when the carriage 23 reaches plate changing position, to thereby de-energize the solenoid 110 and energize the solenoid 111. The switch operating means, also, preferably functions to close the switch 120 and open the switch 121 as the carriage 23 reaches the marking position as determined by the stop member 26, to thereby de-energize the solenoid 111 and to close the energizing circuit of the solenoid 110 at the switch 120, and thus condition said circuit for operation in a succeeding plate changing cycle of operation.

The circuits of the solenioids 110 and 111 are also under the control of a switch 122, interposed in series between the parallel connected switches 116, 118, and the parallel connected switches 120 and 121. The switch 122 is preferably of the normally open type and operates with the switch 118, being closed and remaining closed when, and so long as, the switch operating coil 117 is energized. This operating coil 117 is energized upon closure of the manually operable button switch 116, and thereafter remains energized under the control of the switch 118, during the plate changing cycle of operation, means being provided for opening the switches 118 and 122 when the carriage 23 reaches the marking position determined by the stop member 26. To this end, the switches 118 and 122 may be opened mechanically by the movement of the carriage to its stop determined position, and being normally open switches will thereafter remain open until the manually operable button switch 116 is closed to cause performance of the plate changing cycle of operation.

It will be seen from the foregoing that the plate carrying bar 27, when the carriage means is in marking position, may be advanced through its several transverse line marking positions by repeated closure of the button switch 113. After the plate being marked has been marked with a desired number of lines of characters, it may be ejected from marking position on the palte bar and an unmarked plate may be fed into marking position thereon by merely closing the button switch 116.

Upon closure of the button switch 116, the solenoid 103 is energized to release the holding pawl 94 and the driving pawl 104 to allow the carrying bar 27 on the slide 90 to be returned, under the influence of the spring 97, to plate feeding position on the carriage 23.

As soon as the solenoid 103 is energized by closure of the switch 116, the circuit maintaining switches 118 and 122 are also closed to maintain power in the circuits of the solenoids 103, 110, and 111, during the plate changing cycle of operation, thereby holding the pawls 77, 94, and 104 in released condition. Upon closure of the switch 122, the switch 120 being closed and the switch 121 being open, the solenoid 110 is energized to project the carriage 23 from marking to plate feeding position, at which time the switch 120 opens to de-energize the solenoid 110, and the switch 121 closes to energize the solenoid 111. As soon as the solenoid 111 is energized, it will operate to return the carriage 23 from plate feeding position to the marking position determined by the stop member 26. At that time, the switches 118 and 122 will be opened to de-energize the circuits of the solenoids 103, 110, and 111, and the toggle switch unit 119 will be moved into position with the switch 121 opened and the switch 120 closed, thereby reconditioning the system for a repeat performance as and when the button switch 116 is again closed manually.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. In marking apparatus, the combination, with marking means operable to apply marked characters to a workpiece at a marking station, of track mounted carriage means providing a support for presenting workpieces successively in position to be marked at said marking station, said carriage means being movable on said track to feeding position, and means operable to deliver a workpiece to and shift previously delivered workpieces on said support in response to movement of said carriage means to feeding position.

2. In marking apparatus, the combination, with marking means operable to apply marked characters to a workpiece at a marking station, of track mounted carriage means providing a support for presenting workpieces successively in position to be marked at said marking station, latch means normally holding said workpieces against movement on said support, said carriage means being movable on said track to feeding position, and means operable to release the latch means and deliver a workpiece to and shift previously delivered workpieces on said support in response to movement of said carriage means to feeding position.

3. In marking apparatus, the combination, with marking means operable to apply marked characters to a workpiece at a marking station, of track mounted carriage means providing a support for presenting workpieces successively in position to be marked at said marking station, latch means normally holding said workpieces against movement on said support, locking means to lock the latch means in latching position, said carriage means being movable on said track to feeding position, and means operable to release said locking and said latch means and deliver a workpiece to and shift previously delivered workpieces on said support in response to movement of said carriage means to feeding position.

4. In marking apparatus, the combination, with marking means operable to apply marked characters to a workpiece successively at a marking station, of track mounted carriage means providing a support for carrying workpieces successively into marking position on the support and movable, within a limited marking range, on said track, to present adjacent portions of a supported workpiece, in marking position, successively in position to be marked at said marking station, said carriage means being movable on said track to feeding position, outwardly of said marking range, and means operable to deliver a workpiece to and shift previously delivered workpieces on said support in response to movement of said carriage means to feeding position.

5. In marking apparatus, the combination, with marking means operable to apply marked characters to a workpiece successively at a marking station, of track mounted carriage means providing a support for carrying workpieces successively into marking position on the support and movable, within a limited marking range, on said track, to present adjacent portions of a supported workpiece, in marking position, successively in position to be marked at said marking station, means normally preventing and operable to allow movement of the carriage means, outwardly of said marking range, said carriage means being movable on said track to feeding position, outwardly of said marking range, and means operable to deliver a workpiece to and shift previously delivered workpieces on said support in response to movement of said carriage means to feeding position.

6. In marking apparatus, the combination, with marking means operable to apply marked characters to a workpiece successively at a marking station, of track mounted carriage means providing a support for carrying a plurality of workpieces in adjacent end-to-end relation on the support, in position to be advanced successively into marking position thereon, said carriage means being movable on said track, to present adjacent portions of a workpiece, in marking position, successively in position to be marked at said marking station, said carriage means being movable on said track to feeding position, and means operable to deliver a workpiece on said support and thereby shift the previously delivered workpieces on said support in response to movement of said carriage means to feeding position, whereby to eject said one workpiece from and to deliver an adjacent workpiece into marking position on said support.

7. In marking apparatus, the combination, with marking means operable to apply marked characters to a workpiece successively at a marking station, of track mounted carriage means providing a support for carrying a plurality of workpieces in adjacent end-to-end relation on the support, in position to be advanced successively into marking position thereon, said carriage means being movable on said track, to present adjacent portions of a workpiece, in marking position, successively in position to be marked at said marking station, latch means normally holding said workpieces against movement on said support, said carriage means being movable on said track to feeding position, and means operable to release said latch means and to deliver a workpiece on said support and thereby shift the previously delivered workpieces on said support in response to movement of said carriage means to feeding position, whereby to eject said one workpiece from and to deliver an adjacent workpiece into marking position on said support.

8. In marking apparatus, the combination, with marking means operable to apply marked characters to a workpiece successively at a marking station, of track mounted carriage means providing a support for carrying a plurality of workpieces in adjacent relation on the support, with one of said workpieces in marking position thereon, said carriage means being movable on said track, to present adjacent portions of said one workpiece successively in position to be marked at said marking station, said carriage means being movable on said track to feeding position, and feeding means, operable in response to movement of said carriage means to feeding position, to advance said workpieces on said support, said feeding means comprising a storage magazine for workpieces and ejector means operable to deliver a workpiece from said magazine to the support, and thus to advance previously delivered workpieces on the support.

9. In marking apparatus, the combination, with marking means operable to apply marked characters to a workpiece successively at a marking station, of track mounted carriage means, providing an elongated support formed with a guideway for receiving and carrying a plurality of workpieces in adjacent abutting relationship in said guideway on the support, with one of said workpieces in marking position thereon, said carriage means being movable, within a limited marking range, on said track, to present adjacent portions of said one workpiece successively in position to be marked at said marking station, said carriage means being movable on said track from marking to feeding position, and means operable, in response to movement of said carriage means to feeding position, to deliver an additional workpiece on said support and thus to shift said workpieces in said guideway, whereby to advance said one workpiece from and to deliver an adjacent workpiece into marking position on said support and to eject a previously marked workpiece therefrom.

10. In marking apparatus, the combination, with marking means operable to apply marked characters to a workpiece successively at a common marking station, of means for supporting and moving the workpiece at said station comprising track mounted carriage means, providing an elongated support formed with a guideway for receiving and carrying a plurality of workpieces in adjacent abutting relationship in said guideway on the support, with one of said workpieces in marking position thereon, said carriage means being movable, within a limited marking range, on said track, to present adjacent portions of the workpiece successively in position to be marked at said marking station, said carriage means being movable on said track from marking to feeding position, means operable, in response to movement of said carriage means to feeding position, to deliver an additional workpiece on said support and thus to shift said workpieces in said guideway, whereby to advance said one workpiece from and to deliver an adjacent workpiece into marking position on said support and to eject a previously marked workpiece therefrom, latch means normally holding said workpieces against movement in said guideway, and means to release said latch means when said carriage means is in feeding position.

11. In marking apparatus, the combination, with marking means operable to apply marked characters to a workpiece successively at a common marking station, of means for supporting and moving the workpiece at said station comprising track mounted carriage means, providing an elongated support formed with a guideway for receiving and carrying a plurality of workpieces in adjacent abutting relationship in said guideway on the support, with one of said workpieces in marking position thereon, said carriage means being movable, within a limited marking range, on said track, to present adjacent portions of the workpiece successively in position to be marked at said marking station, means normally preventing and operable to allow movement of the carriage means on said track outwardly of said marking range, said carriage means being movable on said track, outwardly from said marking range, to feeding position, and means operable, in response to movement of said carriage means to feeding position, to deliver an additional workpiece on said support and thus to shift said workpieces in said guideway, whereby to advance said one workpiece from and to deliver an adjacent workpiece into marking position on said support and to eject a previously marked workpiece therefrom.

12. In marking apparatus, the combination, with marking means operable to select and apply marking characters to a workpiece, successively, at a common marking station, as the result of successive marking strokes of said marking means, of track mounted carriage means for supporting and moving the workpiece at said station, said carriage means including a support for carrying a plurality of workpieces in end-to-end relation and for presenting the same successively in marking position, said carriage means being movable, on said track, within a limited marking range, progressively in a longitudinal direction to present adjacent portions of a workpiece, in marking position, successively in position to be marked, at said marking station, whereby to apply a line of marked characters on the workpiece, escapement means for so moving the carriage means progressively within said limited marking range, in response to successive character applying strokes of the marking means, means normally preventing and operable to allow movement of the carriage means, outwardly of said marking range, said carriage means being thus movable on said track to feeding position, outwardly of said marking range, and means operable to deliver a workpiece to and shift previously delivered workpieces on said support in response to movement of said carriage means to said feeding position.

13. In marking apparatus, the combination, with marking means operable to select and apply marking characters to a workpiece, successively, at a common marking station, as the result of successive marking strokes of said marking means, of track mounted carriage means for supporting and moving the workpiece at said station, said carriage means including a support for the workpiece and being movable, on said track, within a limited marking range, progressively in a longitudinal direction to present adjacent portions of the workpiece successively in position to be marked, at said marking station, whereby to apply a line of marked characters on the workpiece, escapement means for so moving the carriage means progressively within said limited marking range, in response to successive character applying strokes of the marking means, means normally preventing and operable to allow movement of the carriage means, outwardly of said marking range, and feeding means operable to advance said workpiece on said support in response to movement of said carriage means to feeding position, said feeding means comprising a storage magazine for workpieces and ejector means, operable by movement of said carriage means into feeding position, for delivering a workpiece from the magazine onto said support and to thus advance previously delivered workpieces on said support.

14. In marking apparatus, the combination, with marking means operable to select and apply marking characters to a workpiece, successively, at a common marking station, as the result of successive marking strokes of said marking means, of track mounted carriage means for supporting and moving the workpiece at said station, said carriage means including a support for the workpiece and being movable, on said track, within a limited marking range, progressively in a logitudinal direction to present adjacent portions of the workpiece successively in position to be marked, at said marking station, whereby to apply a line of marked characters on the workpiece, said support being adjustable on said carriage means in a direction transversely of the direction of movement of the carriage means on the track, whereby to determine the transverse position of a line of marked characters on the workpiece and to allow for the marking thereon of a plurality of lines of characters, means to hold said support in any selected position of lateral adjustment on the carriage means, line shifting means operable to laterally shift said support on the carriage means, said carriage means being movable on said track outwardly of said limited marking range to feeding position with said support in a predetermined position of lateral adjustment, and feeding means for delivering a workpiece to said support in said predetermined position of lateral adjustment, in response to movement of said carriage means to feeding position.

15. In marking apparatus, the combination, with marking means operable to select and apply marking characters to a workpiece, successively, at a common marking station, as the result of successive marking strokes of said marking means, of track mounted carriage means providing a support for the workpiece and movable, on said track, within a limited marking range, to present adjacent portions of the workpiece successively in position to be marked at said marking station, whereby to mark a line of characters on the workpiece, escapement means for so moving the carriage means, progressively within said limited marking range, in response to successive character applying strokes of the marking means, said support comprising an elongated member formed with a guideway for receiving and supporting a plurality of workpieces, in adjacent abutting relation on said support, with one of said workpieces in marking position thereon, latch means for normally holding said workpieces against movement in said guideway, line shifting means operable to adjustably shift the support on the carriage means in a direction transversely of the movement of the carriage means on the track, whereby to determine the transverse position of a line of marked characters on the workpiece and to allow for the marking thereon of a plurality of lines of characters, carriage latch means normally preventing movement of the carriage means, on the track, beyond said limited marking range, means operable to move said carriage means, including said workpiece support, on said track, to a feeding position outwardly of said marking range, and feeding means operable in response to movement of said carriage means to feeding position, to deliver a workpiece into and to advance said workpieces in said way.

16. In marking apparatus, the combination, with marking means operable to select and apply marking characters to a workpiece, successively, at a common marking station, as the result of successive marking strokes of said marking means, of track mounted carriage means providing a support for the workpiece and movable, on said track, within a limited marking range, to present adjacent portions of the workpiece successively in position to be marked at said marking station, whereby to mark a line of characters on the workpiece, escapement means, operable in response to actuation of the marking means, for so moving the carriage means, said support comprising an elongated member formed with a guideway for receiving and supporting a plurality of workpieces, in adjacent abutting relation on said support, with one of said workpieces in marking position thereon, line shifting means for adjusting said support on said carriage means in a direction transversely of the movement of the carriage means on the track, whereby to determine the transverse position of a line of marked characters on the workpiece and to allow for the marking thereon of a plurality of lines of characters, latching means to hold said support in any selected position of lateral adjustment, carriage latch means normally preventing movement of the carriage means on the track beyond said limited marking range, means operable to move said carriage means, including said workpiece support, on said track, to a feeding position outwardly of said marking range, and feeding means comprising a storage magazine for workpieces and ejector means, operable by movement of said carriage means to feeding position, for delivering a workpiece into said guideway and for thus advancing previously delivered workpieces in said guideway.

17. In marking apparatus, the combination, with marking means operable to select and apply marking characters to a workpiece, successively, at a common marking station, as the result of successive marking strokes of said marking means, of means for supporting and moving the workpiece at said station comprising track mounted carriage means providing a support for the workpiece and movable, on said track, within a limited marking range, to present adjacent portions of the workpiece successively in position to be marked at said marking station, said support comprising an elongated member formed with a guideway for receiving and supporting a plurality of workpieces, in adjacent abutting relation on said support, with one of said workpieces in marking position thereon, means operable to move said carriage means, including said workpiece support, on said track, to a feeding position outwardly of said marking range, and feeding means comprising a storage magazine for workpieces disposed in position to abut the support and to present a workpiece in alinement with said guideway when the carriage means is in feeding position, and ejector means, operable by movement of said carriage means to feeding position, for delivering the so presented workpiece into said guideway, thereby advancing previously delivered workpieces in said guideway.

18. In marking apparatus, the combination, with marking means operable to select and apply marking characters to a workpiece, successively, at a common marking station, as the result of successive marking strokes of said marking means, of means for supporting and moving the workpiece at said station comprising track mounted carriage means providing a support for the workpiece and movable, on said track, within a limited marking range, to present adjacent portions of the workpiece successively in position to be marked at said marking station, said support comprising an elongated member formed with a guideway for receiving and supporting a plurality of workpieces, in adjacent abutting relation on said support, with one of said workpieces in marking position thereon, means operable to move said carriage means, including said workpiece support, on said track, to a feeding position outwardly of said marking range, and feeding means comprising a storage magazine for workpieces and ejector means for delivering a workpiece from said magazine into said guideway, comprising a reciprocable workpiece ejector bar normally in retracted position with respect to said magazine, a rack on said bar, rotary gear means engaging said rack, and rack means on said carriage means in position to drivingly engage said gear means, whereby to project the ejector bar into abutting relation with said support and to deliver a workpiece into said guideway, as said carriage moves to feeding position.

19. In marking apparatus, the combination, with marking means operable to apply marked characters to a workpiece at a marking station, of track mounted carriage means providing a support for presenting workpieces successively in position to be marked at said marking station, said carriage means being movable on said track to feeding position, means operable to deliver a workpiece to and to shift previously delivered workpieces on said support, in response to movement of said carriage means to feeding position, and power operated means for shifting said carriage means on said track to feeding position.

20. In marking apparatus, the combination, with marking means operable to apply marked characters to a workpiece at a marking station, of track mounted carriage means providing a support for presenting workpieces successively in position to be marked at said marking station, said carriage means being movable on said track to feeding position, means operable to deliver a workpiece to and to shift previously delivered workpieces on said support, in response to movement of said carriage means to feeding position, power operated means for shifting said carriage means on said track to feeding position, and manually operable means for controlling said power operated means.

21. In marking apparatus, the combination, with marking means operable to apply marking characters to a workpiece at a marking station, of track mounted carriage means for supporting and moving the workpiece at said station, said carriage means including a support for the workpiece and being movable, on said track, within a limited marking range, progressively in a longitudinal direction to present adjacent portions of the workpiece successively in position to be marked, at said marking station, whereby to apply a line of marked characters on the workpiece, said support being adjustable on said carriage means in a direction transversely of the direction of movement of the carriage means on the track, whereby to allow for the marking thereon of a plurality of lines of characters, said carriage means being movable on said track outwardly of said limited marking range to feeding position, feeding means for delivering a workpiece to said support in response to movement of said carriage means to feeding position, and power operated means for shifting said support laterally on said carriage.

22. In marking apparatus, the combination, with marking means operable to apply marking characters to a workpiece at a marking station, of track mounted carriage means for supporting and moving the workpiece at said station, said carriage means including a support for the workpiece and being movable, on said track, within a limited marking range, progressively in a longitudinal direction to present adjacent portions of the workpiece successively in position to be marked, at said marking station, whereby to apply a line of marked characters on the workpiece, said support being adjustable on said carriage means in a direction transversely of the direction of movement of the carriage means on the track, whereby to allow for the marking thereon of a plurality of lines of characters, said carriage means being movable on said track outwardly of said limited marking range to feeding position, feeding means for delivering a workpiece to said support in response to movement of said carriage means to feeding position, power operated means for shifting said support laterally on said carriage, and manually operable means for controlling said power operated means.

23. In marking apparatus, the combination, with a support frame and marking means on said frame and operable to apply marked characters to a workpiece at a marking station, of track mounted carriage means on said frame and providing a support for presenting workpieces successively in position to be marked at said marking station, said carriage means being movable on said track to feeding position, latch means normally holding said workpieces against movement on said support, with one of the workpieces in marking position thereon, said latch means comprising a detent member shiftable on said support and normally urged thereon toward latching position, a cam portion operable to retract said detent member from latching position, a latch release comprising a cam actuator on said frame in position to engage said cam portion in response to movement of the carriage toward feeding position, and means operable to deliver a workpiece to and to shift previously delivered workpieces on said support in response to movement of said carriage means toward feeding position following operation of said cam actuator.

24. In marking apparatus, the combination, with a support frame and marking means on said frame and operable to apply marked characters to a workpiece at a marking station, of track mounted carriage means on said frame and providing a support for presenting workpieces successively in position to be marked at said marking station, said carriage means being movable on said track to feeding position, latch means normally holding said workpieces against movement on said support, with one of the workpieces in marking position thereon, a locking cam shiftable on said support and normally urged into position to lock the latch means in latching position, said latch means comprising a detent member shiftable on said support and normally urged thereon toward latching position, a cam portion operable to retract said detent member from latching position, a lock release and a latch release comprising cam actuators on said frame in position respectively to engage said shiftable locking cam and the cam portion of said latch member in succession in response to movement of the carriage toward feeding position, and means operable to deliver a workpiece to and to shift previously delivered workpieces on said support in response to movement of said carriage means toward feeding position following operation of said cam actuators.

25. In marking apparatus as set forth in claim 24, wherein the workpiece support is transversely shiftable on said carriage means, when in marking position, to allow for the marking of a plurality of lines of characters on the workpiece at the marking station, and wherein the carriage means and workpiece support are movable longitudinally from marking to feeding position, the combination of cooperating means forming facing shoulders on said support frame and workpiece support to prevent movement of the carriage means from marking position toward feeding position when the workpiece support is in laterally shifted position on said carriage means, said cooperating shoulders being positioned to allow carriage movement from marking to feeding position only when said support is in a predetermined position of lateral adjustment with respect to the carriage means.

26. In marking apparatus, the combination, with a support frame and marking means on said frame and operable to apply marked characters to a workpiece at a marking station, of track mounted carriage means, a support on said carriage means for presenting workpieces successively in position to be marked at said marking station, said carriage means and support being longitudinally movable on said track to feeding position and said support being transversely movable on said carriage means, in marking position, to allow for the marking on a workpiece of a plurality of lines of marked characters, and cooperating means forming facing shoulders on said support frame and workpiece support to prevent movement of the carriage means from marking position toward feeding position when the workpiece support is in laterally shifted position on said carriage means, said cooperating shoulders being positioned to allow carriage movement from marking to feeding position only when said support is in a predetermined position of lateral adjustment with respect to the carriage means.

GEORGE R. ISETT.

REFERENCES CITED

The following references are of record in the file of this patent:

UNITED STATES PATENTS

| Number | Name | Date |
|---|---|---|
| 924,198 | Sinisi | June 8, 1909 |
| 1,069,958 | Knurck | Aug. 12, 1913 |
| 1,893,463 | McCain | Jan. 3, 1933 |
| 2,115,455 | Chisholm | Apr. 26, 1938 |